(12) United States Patent
Latham

(10) Patent No.: US 7,545,130 B2
(45) Date of Patent: Jun. 9, 2009

(54) NON-LINEAR CONTROLLER FOR SWITCHING POWER SUPPLY

(75) Inventor: Paul Latham, Lee, NH (US)

(73) Assignee: L&L Engineering, LLC, Lee, NH (US)

( * ) Notice: Subject to any disclaimer, the term of this patent is extended or adjusted under 35 U.S.C. 154(b) by 327 days.

(21) Appl. No.: 11/558,638

(22) Filed: Nov. 10, 2006

(65) Prior Publication Data
US 2007/0108953 A1 May 17, 2007

Related U.S. Application Data

(60) Provisional application No. 60/735,279, filed on Nov. 11, 2005.

(51) Int. Cl.
*G05F 1/56* (2006.01)
(52) U.S. Cl. ..................... 323/283; 323/285
(58) Field of Classification Search ............... 323/265, 323/271, 282, 283, 285; 363/78, 95, 97
See application file for complete search history.

(56) References Cited

U.S. PATENT DOCUMENTS

| | | | | |
|---|---|---|---|---|
| 5,969,515 A | * | 10/1999 | Oglesbee | 323/283 |
| 6,400,127 B1 | * | 6/2002 | Giannopoulos | 323/283 |
| 6,687,235 B1 | | 2/2004 | Chu | 370/286 |
| 6,871,289 B2 | * | 3/2005 | Pullen et al. | 713/300 |
| 6,873,140 B2 | * | 3/2005 | Saggini et al. | 323/283 |
| 6,940,733 B2 | | 9/2005 | Schie et al. | 363/21.12 |
| 6,992,469 B1 | * | 1/2006 | King | 323/283 |
| 7,038,438 B2 | * | 5/2006 | Dwarakanath et al. | 323/283 |
| 7,183,757 B2 | * | 2/2007 | Nagai | 323/285 |
| 7,432,694 B2 | * | 10/2008 | Brenden et al. | 323/283 |
| 7,436,158 B2 | * | 10/2008 | Huang et al. | 323/224 |
| 2004/0095111 A1 | | 5/2004 | Kernahan | 323/282 |
| 2004/0095113 A1 | | 5/2004 | Kernahan et al. | 323/282 |
| 2005/0156581 A1 | * | 7/2005 | Sutardja et al. | 323/268 |
| 2007/0112443 A1 | | 5/2007 | Latham et al. | 700/29 |
| 2008/0238391 A1 | * | 10/2008 | Williams et al. | 323/283 |

FOREIGN PATENT DOCUMENTS

WO    WO 2006/056918    6/2006

OTHER PUBLICATIONS

U.S. Appl. No. 60/735,279, filed Nov. 11, 2005.
Kelly, A. et al. Control of dc-dc converters by direct pole placement and adaptive feedforward gain adjustment. Applied Power Electronics Conference and Exposition, 2005. Twentieth Annual IEEE, vol. 3, Mar. 6-10, 2005, pp. 1970-1975.

(Continued)

*Primary Examiner*—Jeffrey L Sterrett
(74) *Attorney, Agent, or Firm*—Burns & Levinson LLP; Orlando Lopez

(57) ABSTRACT

Methods and systems for nonlinear control of switching power supplies.

43 Claims, 21 Drawing Sheets

OTHER PUBLICATIONS

Kelly, A. et al. High Resolution DPWM in a DC-DC Converter Application Using Digital Sigma-Delta Techniques. Power Electronics Specialists, 2005 IEEE 36th Conference on, Sep. 11-14, 2005, pp. 1458-1463.

Pun, L. Introduction to Optimization Practice, ISBN 471-70233-1, pp. 173-194.

De Russo, P.M. et al. State Variables for Engineers, John Wiley and Sons, New York, N.Y., 1965, pp. 575-577.

Sheingold, D. H. Nonlinear Circuit Handbook, published by Analog Devices, Inc. Norwood, Massachusetts, Chapter 2.

Dualibe, C. et al. Design of Analog Fuzzy Logic Controllers in CMOS Technologies Implementation, Test and Application, ISBN-10: 1-4020-7359-3.

* cited by examiner

NON-LINEAR CONTROLLER FOR SWITCHING POWER SUPPLY

CROSS REFERENCE TO RELATED APPLICATIONS

This application claims priority of U.S. Provisional Application 60/735,279 entitled "NON-LINEAR CONTROLLER FOR DC TO DC CONVERTERS," filed on Nov. 11, 2005, which is incorporated by reference herein.

BACKGROUND

These teachings relates to switching power supplies (switching converters). These devices are used to efficiently transform to voltage and currents at on level to voltage and current of a different level. Switching converters are particularly important when either high power or battery operation require high efficiency. Switching converters are pervasive throughout many consumer products they are in almost every ball everyday items such as cell phones PDAs personal computers extra. A key feature of the switching power supplies is its small size and low cost, which is achieved through efficient design.

Switching converters are used to convert an input DC voltage to an output DC voltage. Such converters may step down (buck) or step up (boost) the input DC voltage (buck-boost converters are also possible), Conventional power supplies use Pulse Width Modulation (PWM) modulation to control the power devices used in converters. One type of switching converter is a synchronous buck converter. This converter typically has a controller, driver, a pair of switches, and an LC filter coupled to the pair of switches. The controller provides a control signal to the driver which then drives the pair of switches, e.g., a high side switch and a low side switch. The driver alternately turns each switch ON and OFF thereby controlling inductor current and the output voltage of the DC to DC converter. Such controllers typically utilize a pulse width modulated signal to control the state of the high and low side switches.

One of the ways to improve the size and cost of switching converters is to optimize the size of the external passive components. This is achieved by optimizing both the switching frequency and control loop.

With the advent of deep sub-micro CMOS, power supplies with very low voltage, high tolerance and high currents are required. As a result of passive filter components have to be scaled to a very low impedance, and in particular the output capacitance is scaled to be of high quality and large value. This capacitor dominates the size and cost of the switching converters for sub-micro CMOS. In general, the smaller the capacitor, the lower the cost.

There is a need for control techniques that allow the output capacitor to be reduced.

A typical voltage mode controller, shown in FIG. 1, consists of a fixed compensator controlling the pulse width modulator. The input to the fixed compensator is an error signal that is the difference between the desired reference voltage and the output voltage. The typical form of the fixed compensator with a PID controller (proportional derivatives and integral control). This type of control allows for relatively fast performance, provided the converter stays in either discontinuous conduction or continuous conduction. If both action modes are possible the compensator bandwidth has to be lowered to ensure a stable compensation. Because the duty cycle to output voltage transfer function is different between continuous conduction and discontinuous conduction.

One solution to this problem, shown in FIG. 2, is to add an inner high speed current feedback loop. This is similar to rate control for servo mechanisms. The inner current loop linearizes the control of the inductor current. Thus that the current command to output voltage is the same, independent of conduction mode so the compensator can be the same for both operating modes.

This technique is limited however. The primary limitation comes from the fact The inner current loop has limited control authority, ad as such, has rate saturation in the inner part of the loop. This is caused by the finite power supplies that can be applied to inductor. This rate saturation causes loop and instability for high bandwidth. Thus, the current mode controller must have a lower bandwidth in order to be stable particularly at high and low duty cycles. Thus, in some conventional methods, the response of the system to disturbances or other changes can be slower than is desirable.

There is a need for control methods that allow high bandwidth operation.

BRIEF SUMMARY

In one embodiment, the controller of these teachings includes a nonlinear controller component capable of providing a switch state to a switch driver, the switch state corresponding at least one predetermining switching power supply state variable The nonlinear controller component is operatively connected to receive as inputs at least one predetermined switching power supply state variable. A relationship between switch states and at least one predetermined switching power supply state variable is obtained by a predetermined method.

Other embodiments of the controller of these teachings are also disclosed including embodiments in which at least some of the internal states of the switching power supply are estimated.

Embodiments of the controlled switching power supply of these teachings are also disclosed.

For a better understanding of the present invention, together with other and further needs thereof reference is made to the accompanying drawings and detailed description and its scope will be pointed out in the appended claims.

DETAILED DESCRIPTION

Figure 1:
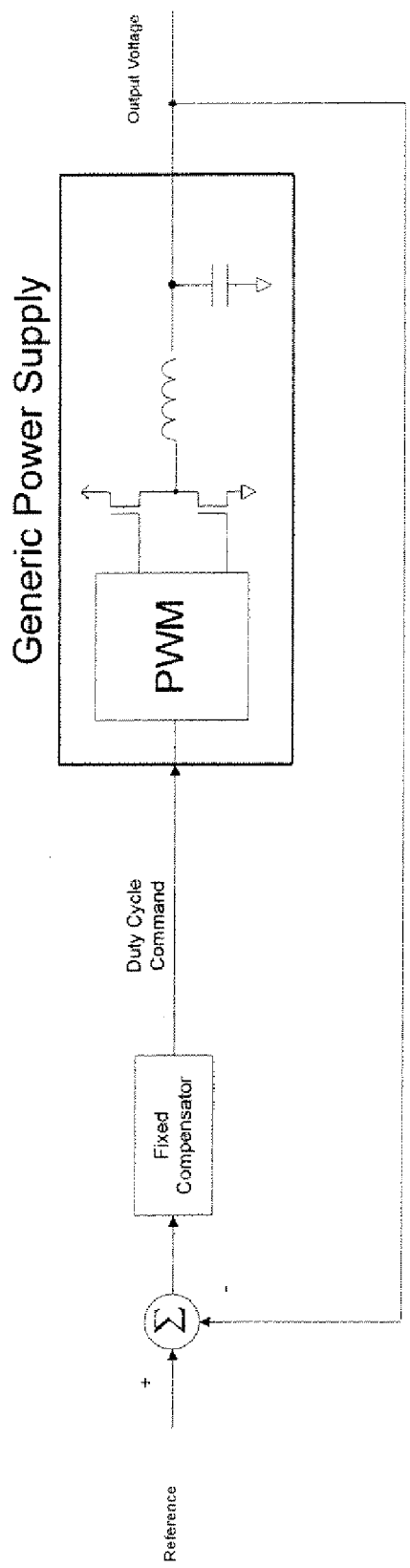
FIG. 1 is a conventional voltage mode controller.
Figure 2:
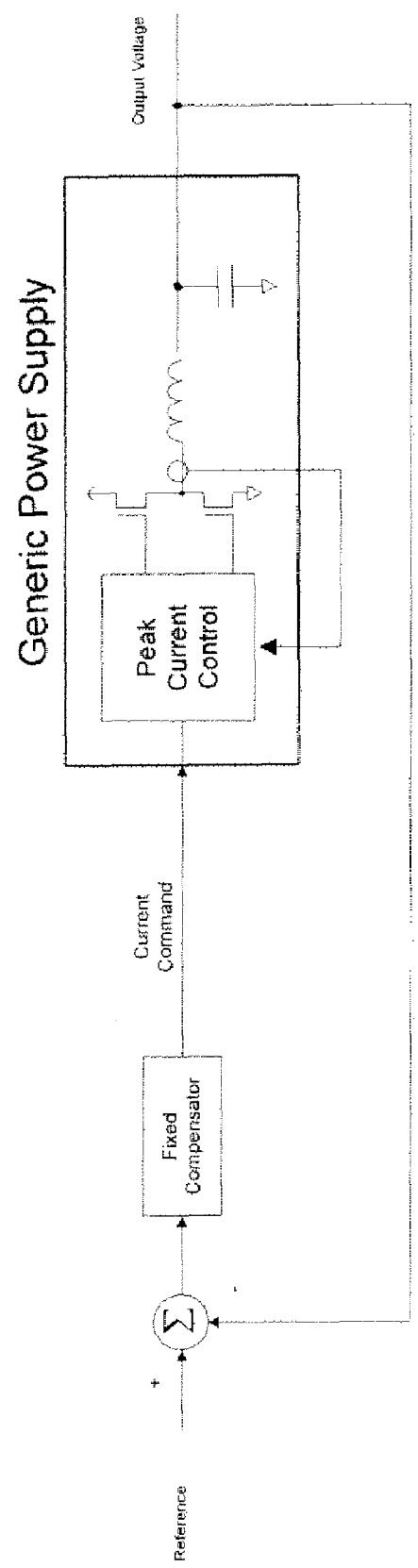
FIG. 2 is another conventional current mode controller.

In one embodiment, the controller of these teachings includes a nonlinear controller component capable of providing a switch state to a switch driver, the switch state corresponding at least one predetermining switching power supply state variable The nonlinear controller component is operatively connected to receive as inputs at least one predetermined switching power supply state variable. A relationship between switch states and at least one predetermined switching power supply state variable is obtained by a predetermined method.

In one instance, the predetermined method includes optimizing a predetermined function of the switch states and internal states.

One embodiment of these teachings uses of a static nonlinear controller that computes the optimum switching surface for controlling the switches in a switching power supply (a DC-to-DC converter in one instance), based on the state of the regulator and its load current.

The optimization function used to define the nonlinear controller in this embodiment can be based on dynamic programming, model predictive control or almost any other optimization technique. In one embodiment, the nonlinear optimization function is a fixed function; given the system parameters, supply voltage, switch states, and internal states. The internal states are the capacitor voltage and inductor current, In one embodiment, by setting up a predetermined penalty function, dynamic programming (see, for example, L. Pun, *Introduction to Optimization Practice*, ISBN 471-70233-1, pp. 173-194 and De Russo, Roy, Close, *State Variables for Engineers*, John Wiley and Sons, New York, N.Y., 1965, pp. 575-577, both of which are incorporated by reference herein) determines the best possible trajectory to minimize, for example, power consumption, consistent with the constraints. With a large load transient, the dynamic programming algorithm can determine the best possible trajectory to maintain regulation.

An example of a cost function to minimize is $$J_k = W_P \sum_{i=0...n} P_{k-i} + W_V(v_C - v_{tar}(Iload_{k+1}))^2 + W_I(\text{abs}(i_L) - \text{Im}ax)|_{abs(i_L) > \text{Im}ax}$$

where
J is the cost to minimize
W's are weights to control effort used
P is the power dissipation for the step which is summed over the last N steps
Imax is the inductor current limit
Vc is the capacitor voltage
Iload is the current load current (K+1, or predicted is used)
Var is voltage margining function which uses the tolerance specification to add droop at high currents to improve the maximum error for load steps.

Dynamic programming is possible in the instance of large load transient because of the small number of possible inputs (i.e. the switch states), the short time horizon that the converter operates overt and the low degree of complexity of the plant (i.e. second order).

In one instances at a constant load current, operation of the controller consists of repeated application of changes in switch state to maintain desired voltage margined output voltage as well as optimizing efficiency. At light load currents this involves "tri-state"-ing the switches to minimize negative inductor current.

Other constraints are easily achieved. One constraint would be to limit the maximum inductor current. This is done by changing the switch state when the inductor current exceeds the maximum positive (or negative) value, then reapplying the original switch state after some period of time. The time interval is chosen to trade off maximum average inductor current and switching losses.

The constraint of low audible voice (audible noise) is achieved by requiring a switch after a long time has occurred since the last switching event. The frequency of the switching events is thus constrained to be above, say, 20 kHz. The above constraints are exemplary; other constraints are within the scope of these teachings.

Substantially efficient light load operation occurs by switching between charging, discharging, and tri-state. Such switching keeps the inductor current from going negative, as in the discontinuous conduction mode.

The nonlinear switching function can be implemented by a fixed lookup table, a DSP, or other analog or digital hardware. With a digital approach, the sampling time needs to be fast enough such that the dynamics of the regulator to not change much between sampling instances. One exemplary analog embodiment includes a piece wise linear approximation using comparators. One exemplary digital embodiment includes the use of a read only memory that would compute the correctness which state based on the inputs. Another exemplary digital embodiment includes a DSP or digital signal processor that computes the required switch states based on algebraic solutions of the equations.

An exemplary embodiment is described below in order to better illustrate the system of these teachings. The exemplary embodiment uses a buck converter topology. However the methods of these teachings are applicable to any generic converter of buck, boost, or buck-boost, forward, fly-back, SEPIC, cuk, etc type. With some of these other types of converters, many switch states are possible. For example in the buck-boost topology, the switch states are buck, boost, buck-boost, short across the inductor, and open. With the buck topology, the switch states are charging, discharging, and tri-state.

Figure 3A:
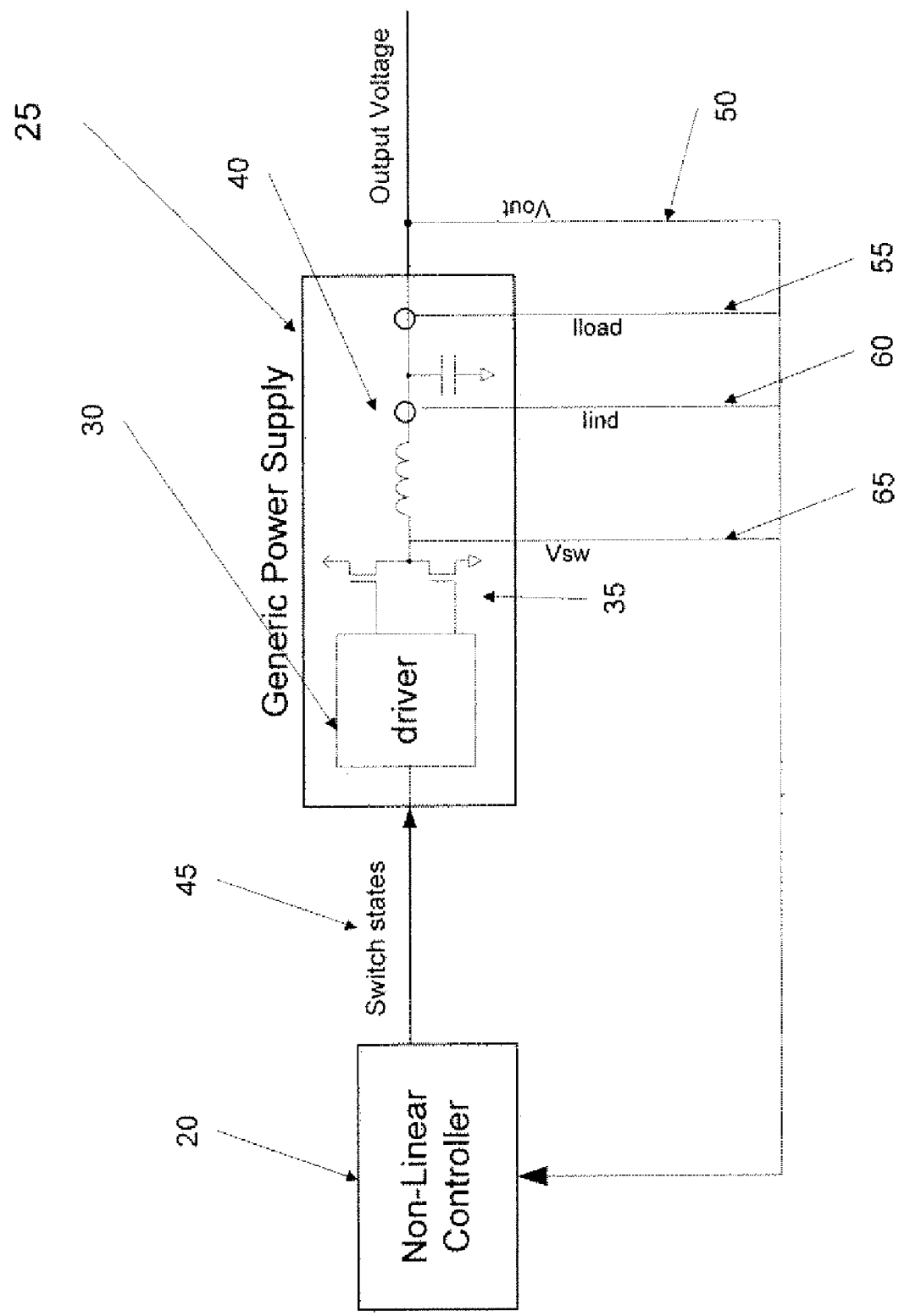
FIG. 3a-3d are block diagrams depicting embodiments of the nonlinear buck controller of these teachings.

A block diagram depicting the general form of the nonlinear controller is shown in FIGS. 3a-3d. It should be noted that the controller can be used for any generic power supply. Referring to FIG. 3a, a nonlinear controller 20 provides switch states 45 to a switch driver 30. The nonlinear controller 20 receives as inputs the output from a switching power supply 25 and a number of switching power supply internal state variables, for example, in the embodiment shown in FIG. 3a, the voltage at the inputs to the circuit including the two or more reactive components 65, Vsw, the current through the inductor 60, the load current 55 and the output voltage 50.

Figure 3B:
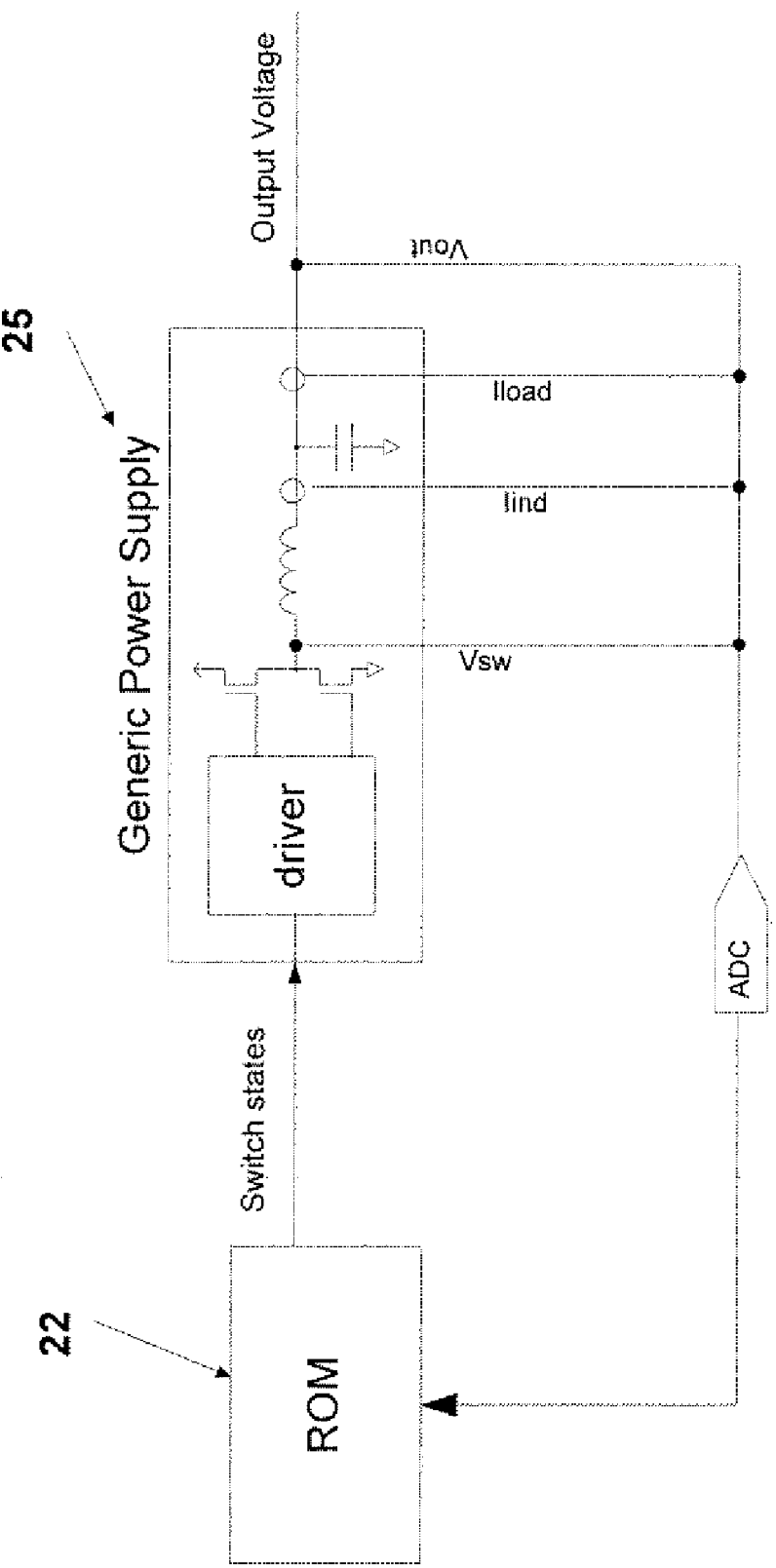

FIG. 3b depicts the embodiment in which the nonlinear controller is implemented as a memory 22 (a ROM in the instance shown). The memory is used to implement a lookup table (a data structure stored said memory, the data structure including a number of switch states, each switch state having one or more corresponding predetermined switching power supply state variables; said each switch state, when provided to the switch driver of the switching power supply at the corresponding predetermined times, enables obtaining a predetermined switching power supply output.

Figure 3C:
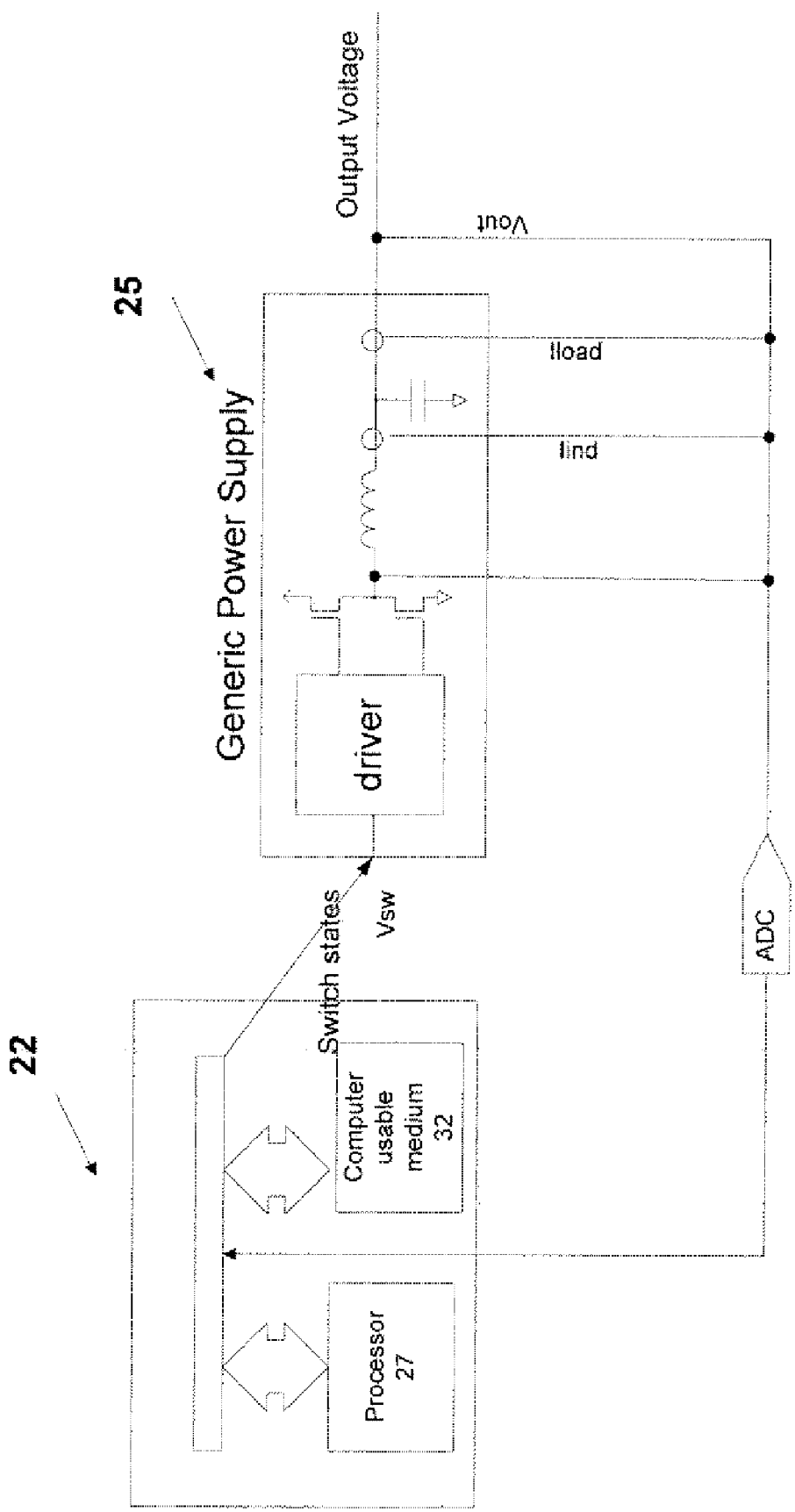

FIG. 3c depicts the embodiment in which the nonlinear controller is implemented as one or more processors 27 and one or more computer usable media 32 having computer readable code embodied therein that causes the processors 27 to obtain a sequence of switch states as described herein above. The processor 27, the one or more computer usable media 32 and the inputs are operatively connected by means of an interconnection component (such as a computer bus). In one instance, the one or more processors 27 and the one or more computer usable media 32 are part of a DSP.

Figure 3D:
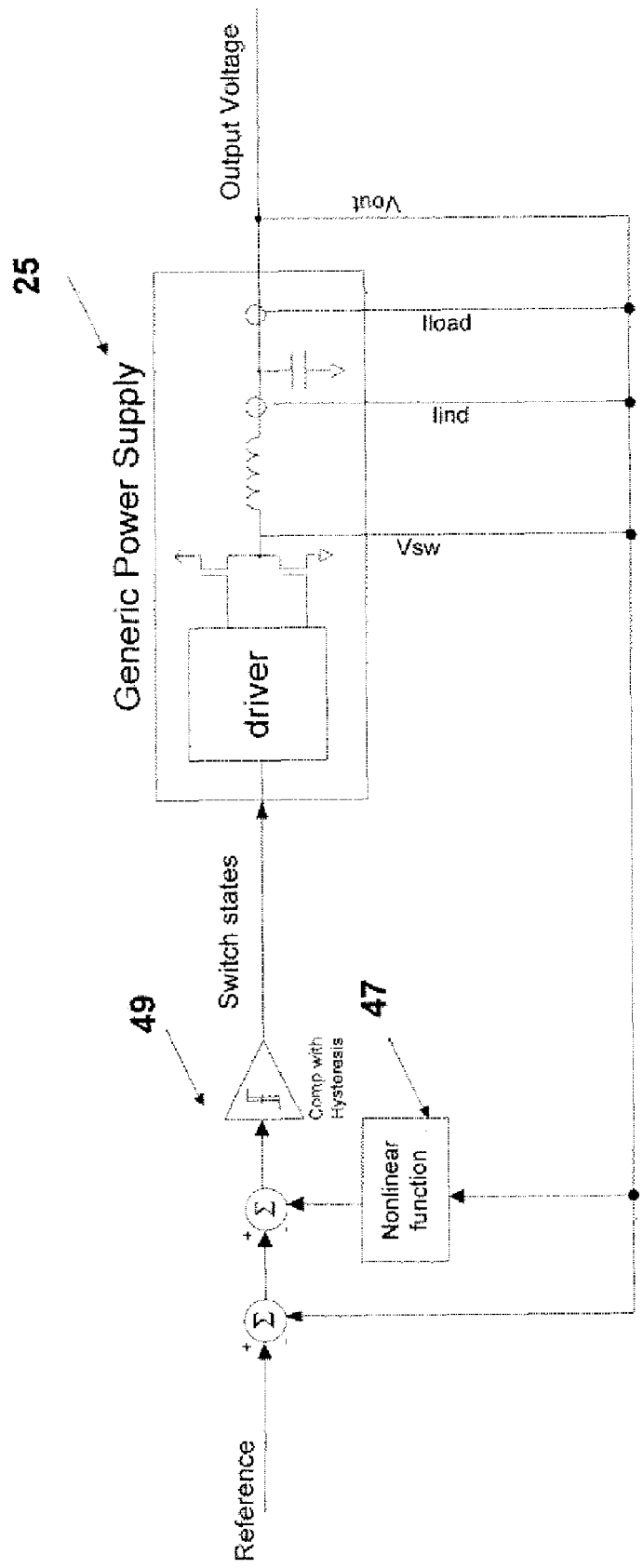

FIG. 3d depicts the embodiment which the nonlinear controller is implemented as a piece wise linear approximation using a non-linear analog circuit 47 and a comparator 49 to control the switch state. Multiple outputs from the non-linear analog circuit combined with multiple comparators can be used in a similar way to implement more than two switch states. For example, switch open or Tri-state can be achieved. Many methods of implementing non-linear analog circuits (see, for example, Danial H. Sheingold, *Nonlinear Circuit Handbook*, published by Analog Devices, Inc. Norwood, Mass., chapter 2 and, Dualibe, Carlos, Verleysen, M., Jespers, P, *Design of Analog Fuzzy Logic Controllers in CMOS Technologies Implementation, Test and Application*, ISBN-10: 1-4020-7359-3, both of which are incorporated by reference herein).

Figure 4:
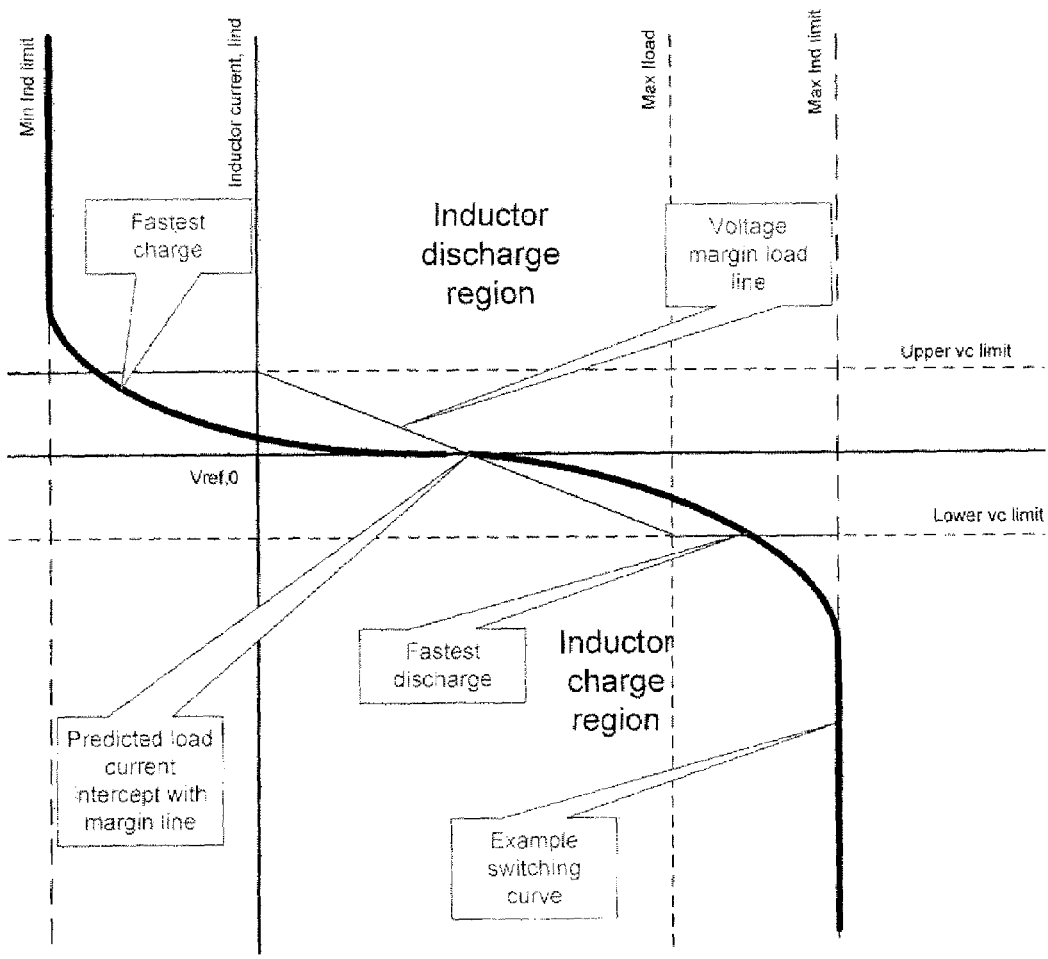
FIG. 4 shows a generic switching curve used by an embodiment of the nonlinear controller of these teachings.

FIG. 4 shows a generic switching curve used by an embodiment of the nonlinear controller. The curve can either be calculated From analytical expressions or derived numerically. In one instance, the numerical technique is discrete dynamic programming. With this technique, the derivation starts at the final desired state and works successively backwards in time, enumerating all possible switch states at each time instance. At each time step, a cost function is used to evaluate the quality of all choices of switch state up to that point in time. This is continued back in time until a complete plane has been generated for all possible system states. This plane is then used to program a nonlinear controller. If this becomes numerically intractable several other techniques exist. One technique is based on model predictive control; another is derived from techniques used for generalized optimization problems, such as genetic programming, simulated annealing, exhaustive numerical search, and neural networks, among others. With model predictive control, the controller starts at its current location and figures out the optimum trajectory up to some future time (see, for example, Mayne, D. Q.; Michalska, H, *Adaptive receding horizon control for constrained nonlinear systems*, Proceedings of the 32nd IEEE Conference on Decision and Control, 1993, Date: 15-17 Dec. 1993, Pages: 1286-1291 vol. 2, which is incorporated by reference herein). Using that trajectory, the system state at the next time step is computed, and the process repeated for every time step until the final time is reached.

The switching surface is graphically displayed in the phase-plane with inductor current on the vertical axis and capacitor voltage on the horizontal axis. The upper and lower Vc limits show the range of acceptable capacitor voltages. The maximum and minimum inductor current limits are also shown. A common technique used in all modern power supplies is voltage margining; this is a load line that relates the optimum voltage to the static load current. At high load currents, a transient will only lower the load current, thus the output voltage will only go up. As a result the capacitor voltage should be kept near the lower limit. Likewise the converse is true.

The embodiment of the switching curve of these teachings is used as follows. The future load current is predicted or estimated, and the inductor current required to achieve that load current is calculated based on steady-state volt-second balance, the optimum voltage on the load line is thus determined This is the target future state. The switching curve is used to compute backwards in time from that state for all possible inputs the best way to get from a present location in the state space to the target future state location.

In one instance, the optimum target voltage is determined by the load current. This is referred to as voltage margining. When the load current is low the output voltage should not be near its upper limit because the load pull only cause it to go down and when the load current is at maximum the output voltage should be at a lower limit because the load current can only go up. This improves the error due to a transient load event. Typical voltage marching curve is a straight line that connects the upper voltage limit at zero load current to the lower voltage limit at maximum of load current.

Figure 5:
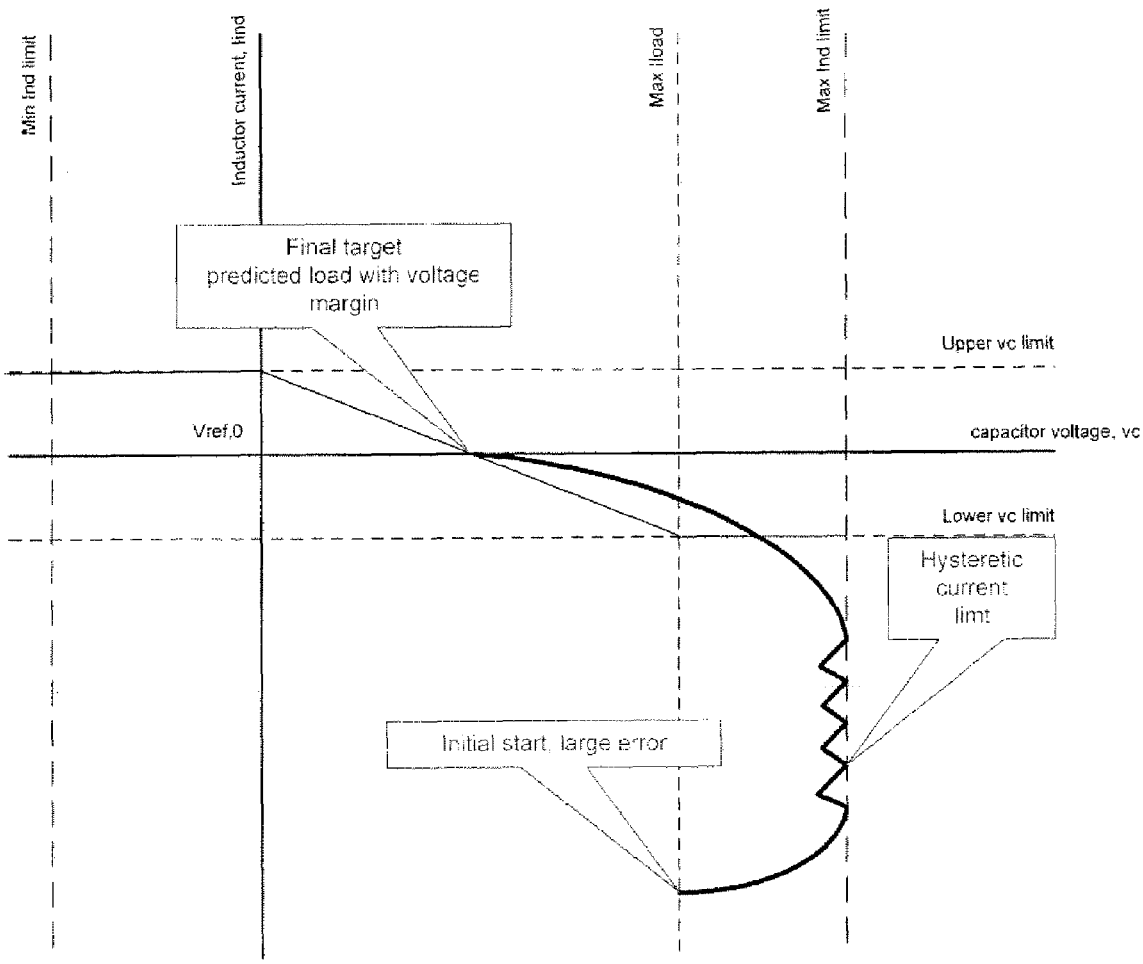
FIG. 5 shows the start up transient of an embodiment of the nonlinear controller of these teachings.

FIG. 5 shows the start up transient. Initially the inductor is switched to charge until the upper current limit is met. The inductor is then switched between discharge and charge, achieving a hysteretic control along the maximum current limit. This is similar to a sliding mode control scheme, where the sliding surface is the maximum inductor current. Inductor current is kept at this high level until the last possible moment in time. When the switching surface commands a change to discharge, the regulator gracefully transitions to the optimal state space target.

Figure 6:
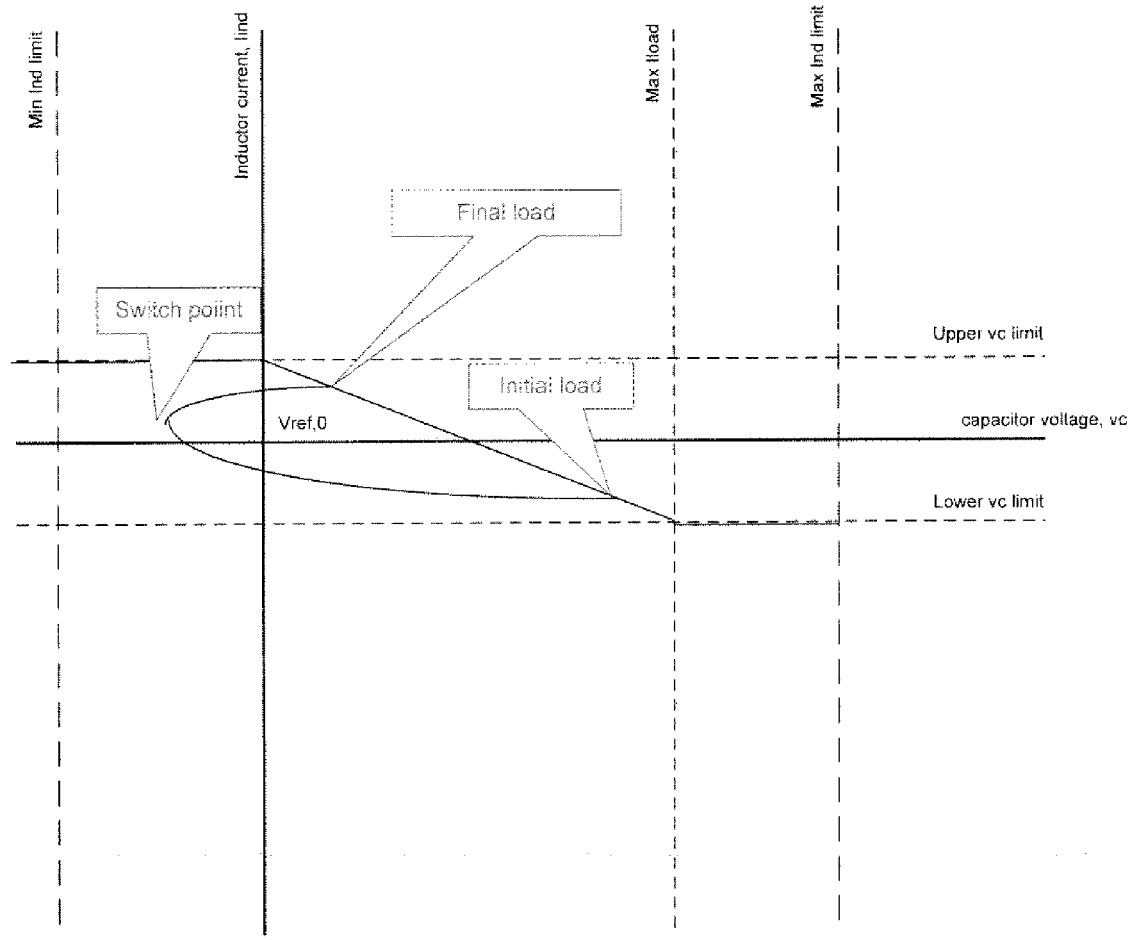
FIG. 6 shows an example of a large negative current step of an embodiment of the nonlinear controller of these teachings.

FIG. 6 shows an example of a large negative current step. The switch is controlled by the switching surface to discharge and then back to charge again in a way that moves the capacitor voltage in the shortest time.

Figure 7:
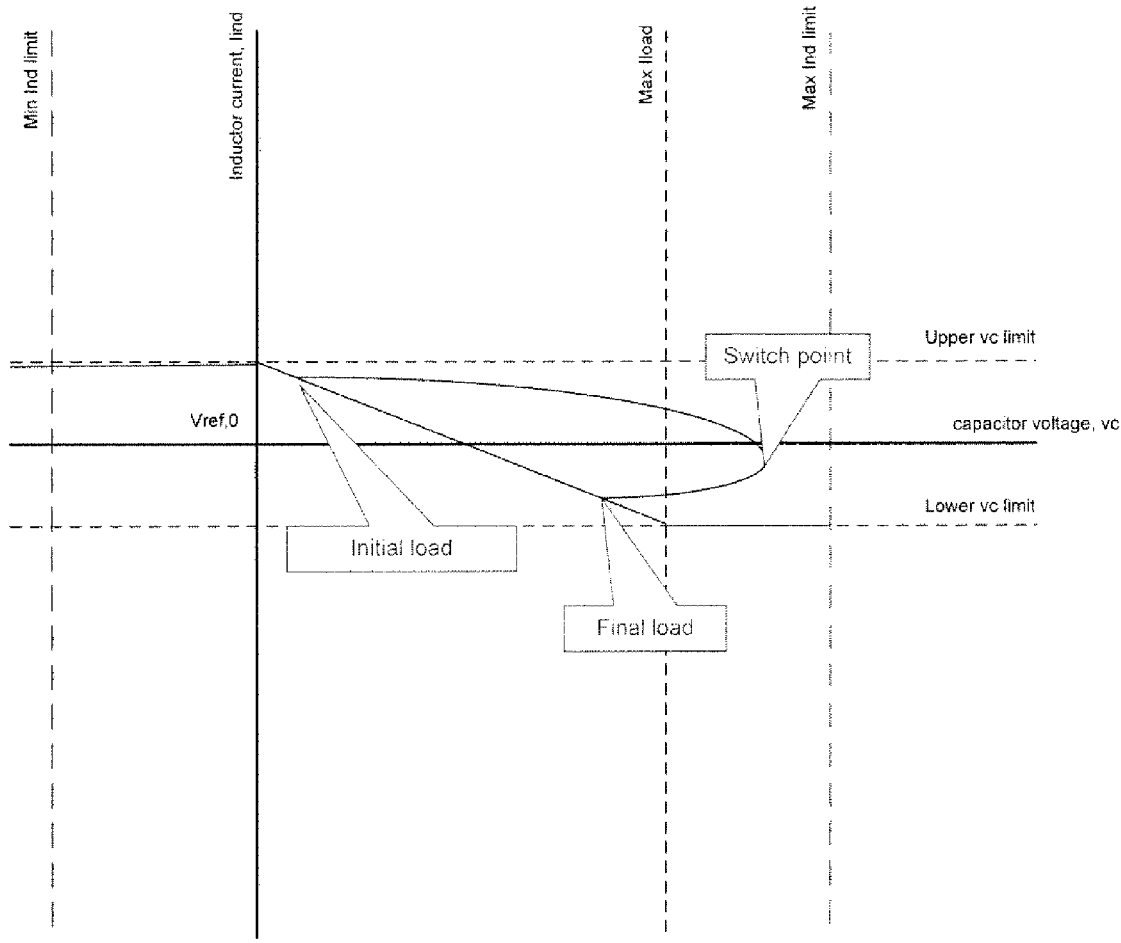
FIG. 7 shows a positive load step of an embodiment of the nonlinear controller of these teachings.

FIG. 7 shows a positive load step. This is substantially the converse of the previous diagram. Again the switches are controlled from charging to discharging to move the capacitor voltage in the minimum amount of time.

Figure 8:
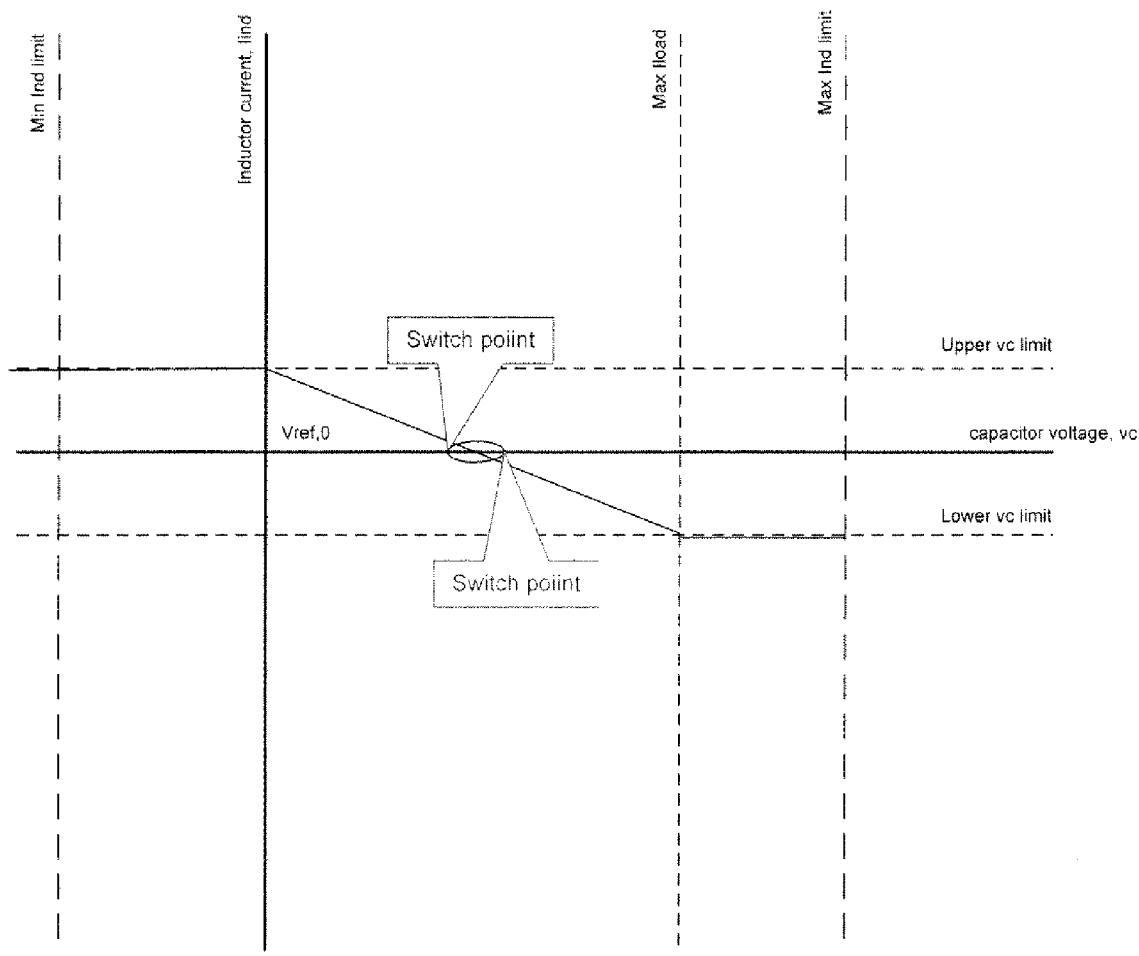
FIG. 8 shows an example of a stable orbit for a constant large load current.

FIG. 8 shows an example of a stable orbit for a constant large load current. The switches periodically go from charging to discharging, keeping the voltage and current variations contained within a small region.

Figure 9:
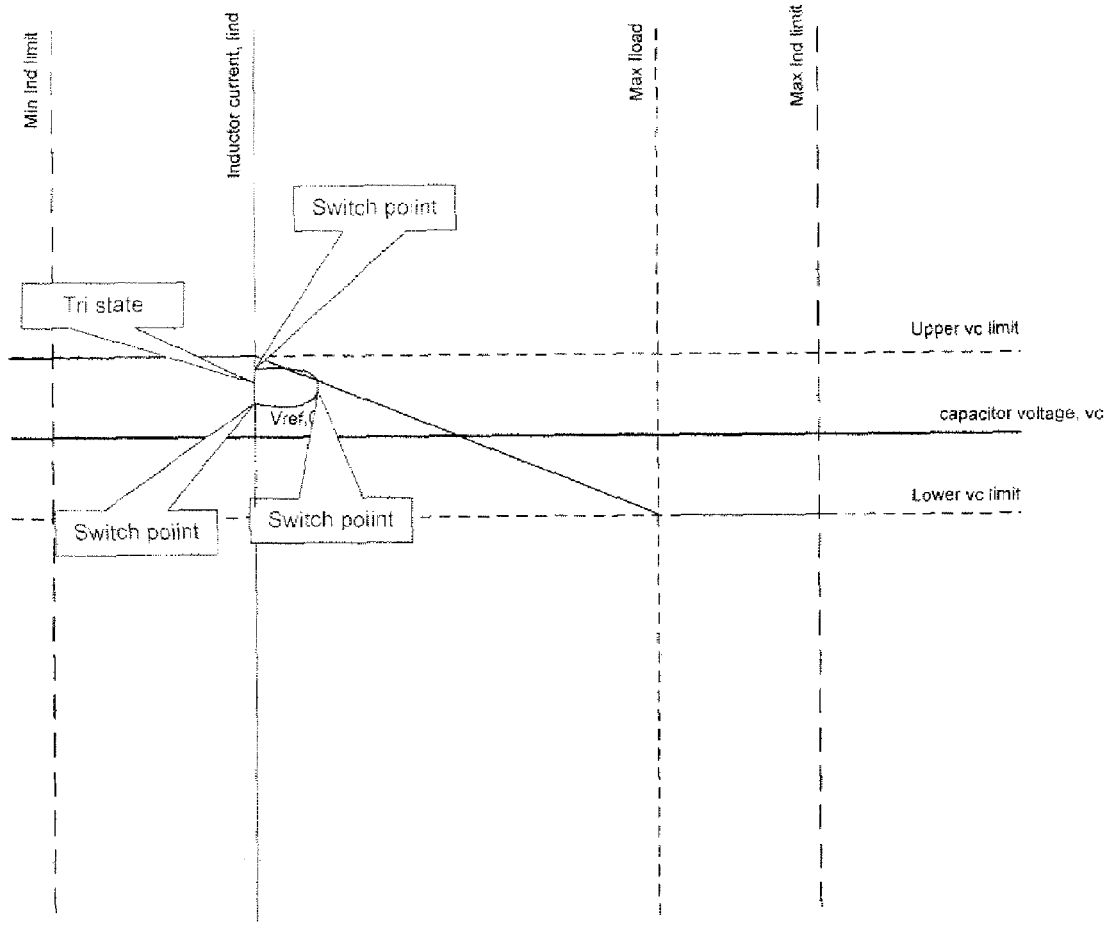
FIG. 9 shows a stable orbit for a light load.

FIG. 9 shows an example of a stable orbit for a light load. Note the switches go from charging to discharging to tri-state. Tri-state keeps the inductor current from going negative, improving the efficiency.

Figure 10:
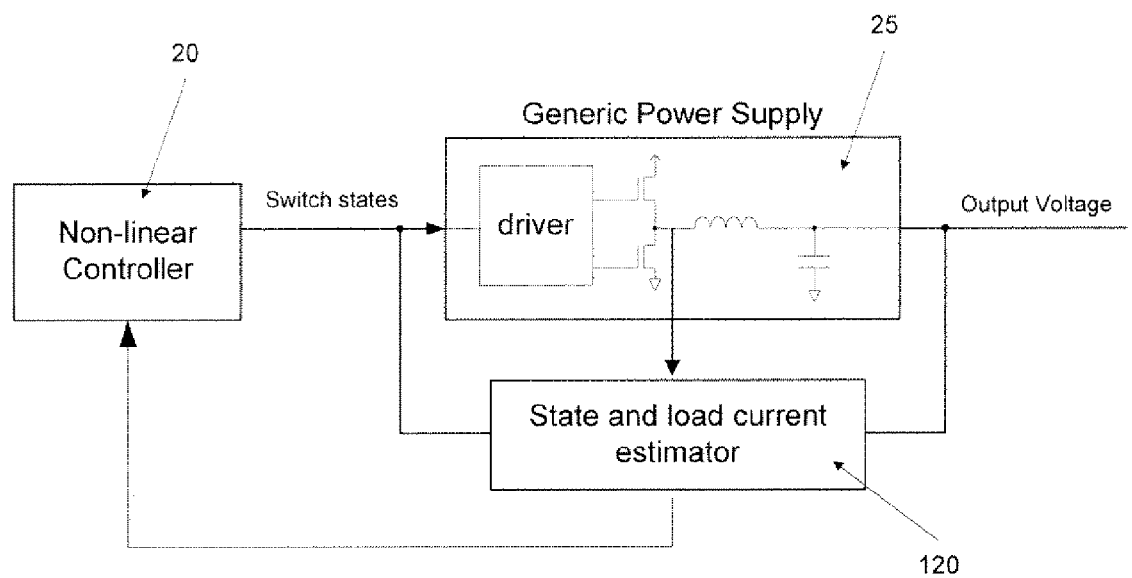
FIG. 10 shows an embodiment of the system of these teachings including a state estimator.

In one embodiment, to achieve the nonlinear controller it is necessary to know both the capacitor voltage and the inductor current. The capacitor voltage and inductor current can be obtained by direct measurements. In another embodiment, the capacitor voltage and inductor current can be a pain by means of an estimator. The proposed state estimator is designed (by traditional techniques, such as, but not limited, least squares estimators, Bayesian estimators or by the techniques described in US patent application 2XXX/XXXXXX, corresponding to U.S. patent application Ser. No. 11/553,917, both of which are hereby incorporated by reference) with augmented states to estimate load current as well. An embodiment of the system of these teachings including a state estimator 120 is shown in FIG. 10.

In some embodiments, the (adaptive in one embodiment) plant estimator component 120 utilizes the LMS algorithm in order to provide an estimate of the state variables of the Switching power supply 25. (For a description of the LMS algorithm, see, for example, S. Haykin, *Introduction to Adap-*

*tive Filters*, ISBN 0-02-949460-5, pp. 108-110, which is incorporated by reference herein.). In other embodiments, the (adaptive) plant estimator component 120 utilizes and RLS algorithm (for a description of the RLS algorithm, see, for example, S. Haykin, *Introduction to Adaptive Filters*, ISBN 0-02-949460-5, pp. 139-143, which is incorporated by reference herein).

As disclosed in U.S. patent application Ser. No. 11/553,917, in one embodiment, the controller of these teachings includes a sampling component capable of sampling an output signal from a system and an input signals from the system at a first sampling rate, the first sampling rate being at least equal to a predetermined operating rate, an input parameter obtaining component capable of receiving the output signal and the input signal sampled at the first sampling rate and of obtaining values for a plurality of input parameters, the values for the input parameters being sampled at the first sampling rate, a decimator component capable of receiving the values for the input parameters sampled at the first sampling rate and of providing subsampled values for the input parameters, subsampled values being sampled at a second sampling rate, the second sampling rate been slower than the first sampling rate, an adaptive plant estimator component capable of receiving the subsampled values of the input parameters and of obtaining a model of the system, the model reflecting variations in the system.

As disclosed in U.S. patent application Ser. No. 11/553,917, in another embodiment, the method of these teachings includes sampling an output signal from a system and an input signal from the system., obtaining, from the sampled output signal and the sampled input signal, values for a predetermined finite number of rows and columns from an inverse matrix and a predetermined finite number for a row vector in a least-squares solution, and obtaining, from the values for the predetermined finite number of rows and columns from an inverse matrix and the predetermined finite number for a row vector in a least-squares solution, and model for the system. Once a model of the system is obtained, an adaptive control method can be implemented.

Figure 11:
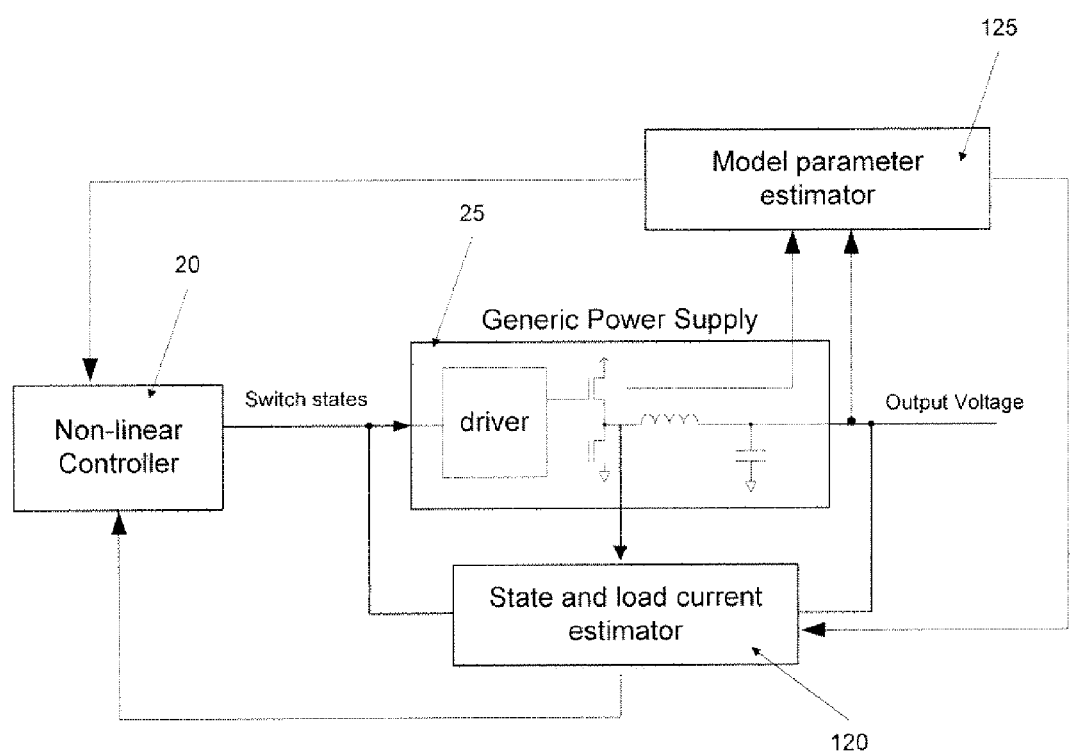
FIG. 11 shows an embodiment of the system of these teachings including a state and load current estimator.

In one instance, shown in FIG. 11, the model parameters could be estimated, by a model parameter estimator 125, along with the state and load current estimator 120.

As disclosed in U.S. patent application Ser. No. 11/553,917, in one exemplary embodiment, these teachings not being limited to that exemplary embodiment, parameters of the system 25 (DC-to-DC power supply) vary slowly. Therefore it is possible to make the parameter updates a slower, offline computation In a state estimator design, an analog-to-digital converter (ADC) measures the output and input (and intermediate in some embodiments) voltages in the power supply 25. The ADC results are also used by auto- and cross-corrrelators to measure the behavior of the power supply 25. The parameter computation are done offline at a lower sampling rate. This lowers the cost of those tasks, because the digital logic can be in the form of a simple micro-sequencer.

Figure 12:
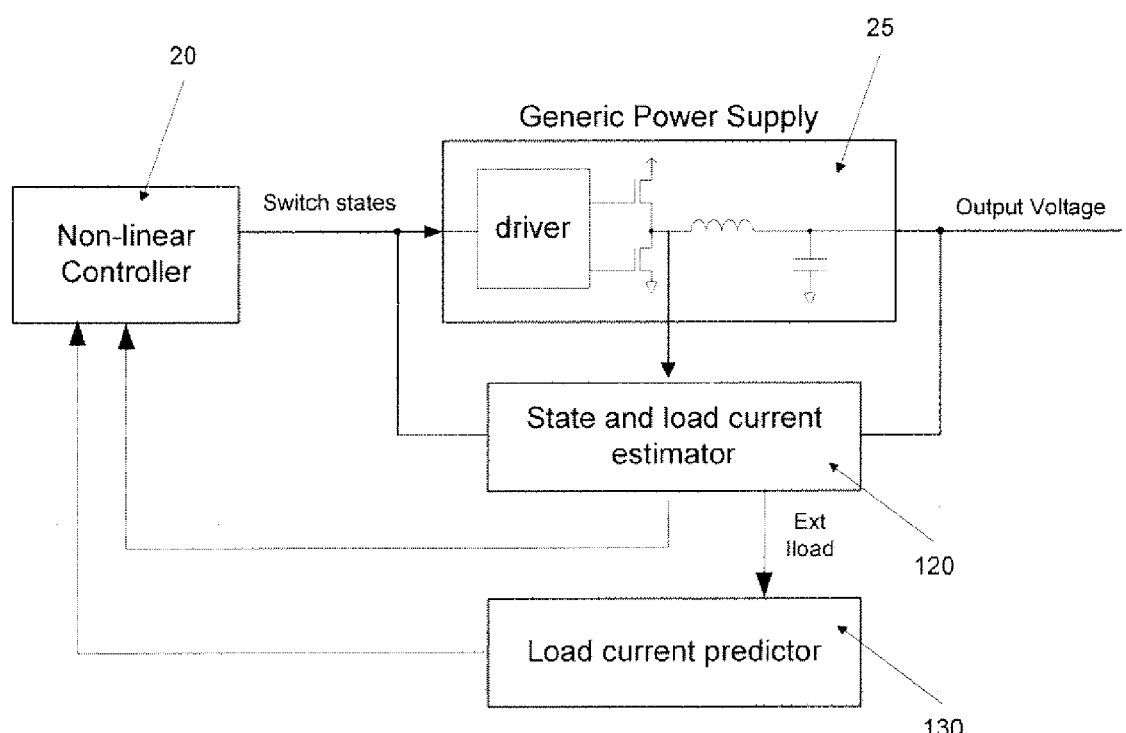
FIG. 12 shows an embodiment of the system of these teachings in which the future load is predicted from the trends in the past load current.

In another embodiment, shown in FIG. 12, the controller of these teachings also includes a load current estimating component 120. As disclosed in U.S. patent application Ser. No. 11/553,917, in one embodiment, the load current estimating component is capable of receiving the output signal sampled at the first sampling rate and state estimation data from the (adaptive) plant estimator component and of providing estimated load current data at a first sampling rate and another decimator component capable of receiving the estimated load current data at the first sampling rate and of providing estimated load current data at the predetermined operating rate to the non-linear controller 20.

In one instance, As disclosed in U.S. patent application Ser. No. 11/553,917, the ADC is an oversampling ADC, a Delta Sigma ADC in one embodiment, including a an oversampling modulator, delta-sigma modulator in the above embodiment, and a decimation filter. The oversampling modulator converts the analog input voltage into a high-speed, digital bit stream. The digital bit stream may be as little as one bit wide. Because the digital bit stream is sampled at a very high rate, it is possible to low-pass filter the bit stream and to recover a high-precision, lower-sample-rate representation of the analog signal.

In one embodiment, the sampling component is a oversampling (sigma delta in one embodiment) modulator and the first sampling rate is an oversampled rate. In one embodiment, the input parameter obtaining component is an autocorrelation and crosscorrelation estimator. It should be noted that other embodiments of the input parameter obtaining component are possible and within the scope of these teachings. It should also be noted that embodiments are possible in which the oversampling (sigma delta in one embodiment) modulator provides inputs to the state estimator and the load estimator.

In many applications, including the DC-to-DC converter application, and in particular for embodiments utilizing the cross- and autocorrelation functions, the decimation filter (decimator) function can be built-in, This reduces the cost because a one-bit multiplier is just a single gate, while a high-precision digital multiplier can be a costly design, It should be noted that, although the embodiments shown above have not been explicitly adaptive, adaptive embodiments of the non-linear controller are possible and within the scope of these teachings. For example, once the states are estimated, as in FIGS. 10 and 11, the cost function can be adapted to the identified states and the nonlinear controller can be an adaptive nonlinear controller. In the embodiment shown in FIG. 3B, the memory use is not a ROM but instead a RAM, which is altered by an adaptive component.

In a another embodiment, shown in FIG. 12, the future load is predicted from the trends in the past load current by means of a load current predictor 130. This type of prediction can be done, in one instance, by a FIR or finite impulse response filter and, in another instance, by an infinite impulse response filter (or IIR filter). The filter coefficients could be determined, in one instance, by an LMS like algorithm and, in another instance, by an RLS like algorithm. It should be noted that these teachings are not limited to only those two algorithms. Other algorithms, such as, but not limited to, neural networks, can also be used for prediction. (See, for example, S. Haykin, *Introduction to Adaptive Filters*, ISBN 0-02-949460-5, pp. 41-89, which is incorporated by reference herein.)

Figure 13:
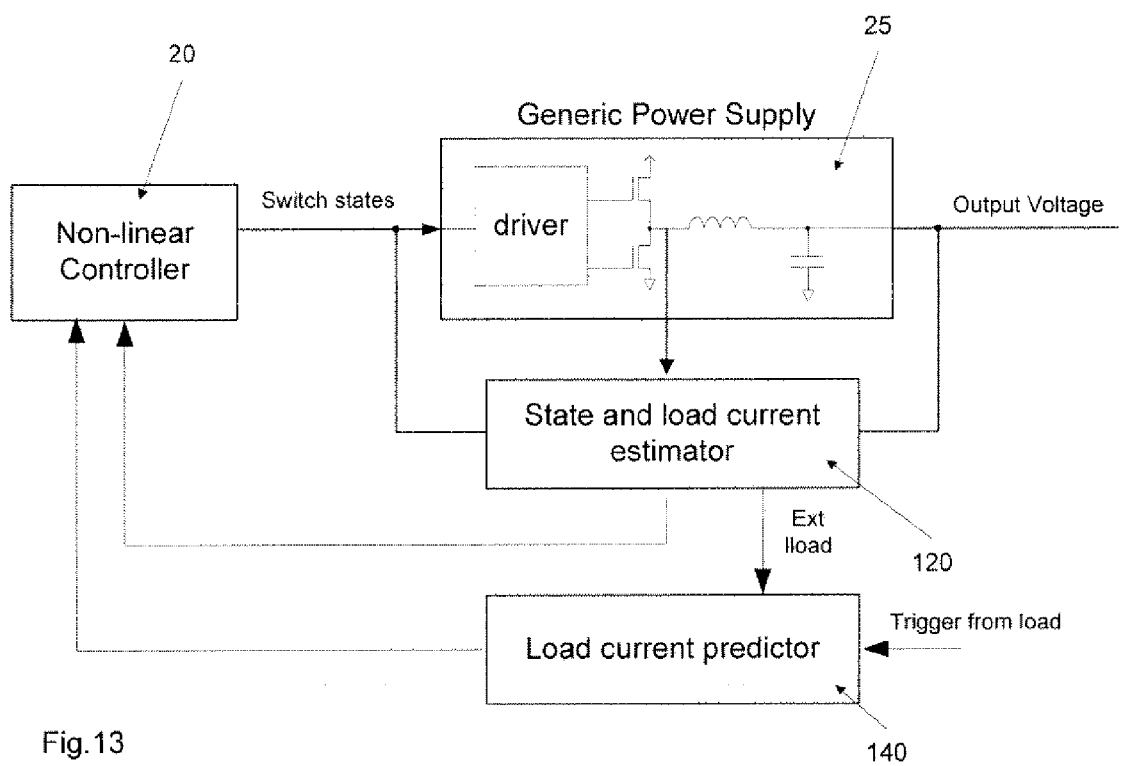
FIG. 13 shows an embodiment of the system of these teachings in which information indicating that the load is about to have an abrupt change can be obtained.

In another instance, shown in FIG. 13, information indicating that the load is about to have an abrupt change can be obtained. This input could be processed by a load curve predictor 140a. In one embodiment, the load current predictor is a nonlinear look up table In another embodiment techniques such as those described by John Canfield's Ph.D., thesis, Electrical Engineering, U.N.H, 2003, which is hereby incorporated by reference, our use. A nonlinear lookup table technique such as the cerrebular model articulation controller (CMAC) is used in one embodiment.

Figure 14:
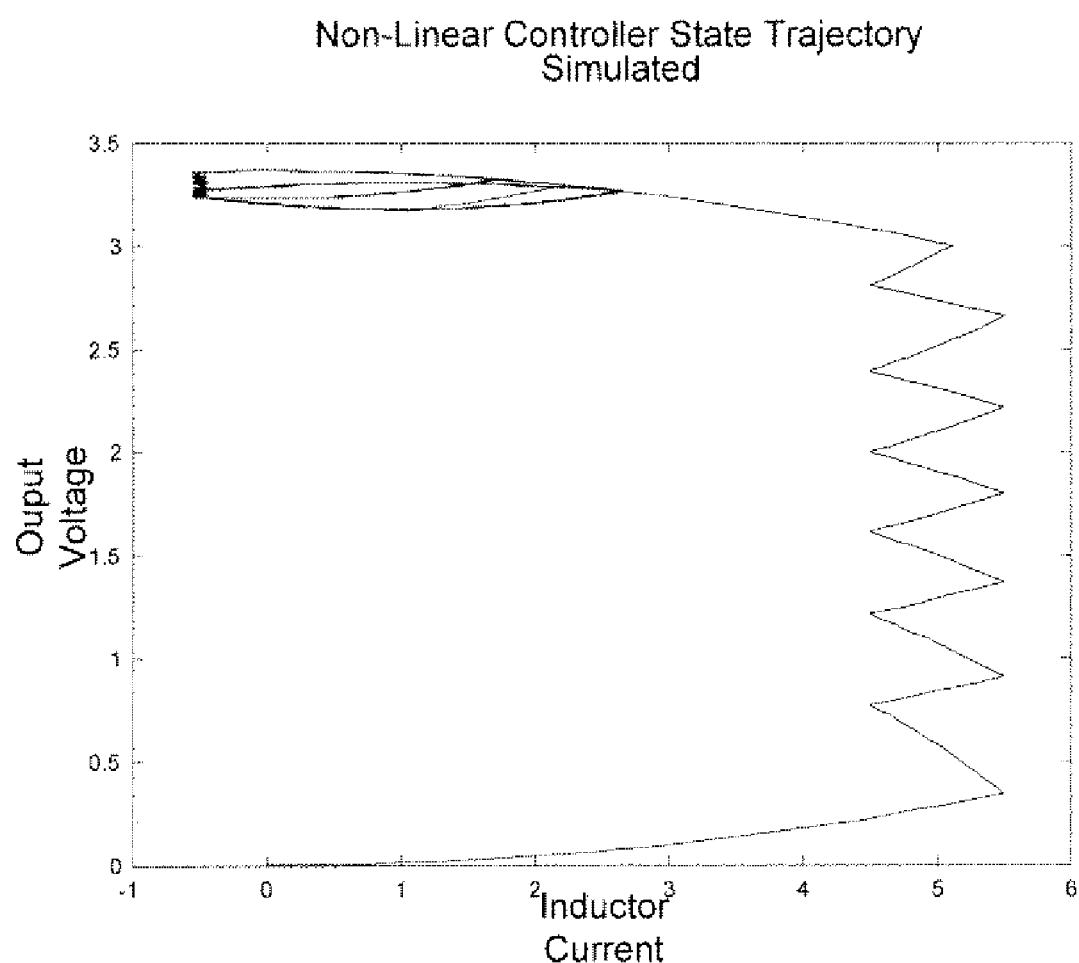
FIG. 14 shows a startup trajectory in the phase plane for a simulation of one embodiment of the system of these teachings.
Figure 15:
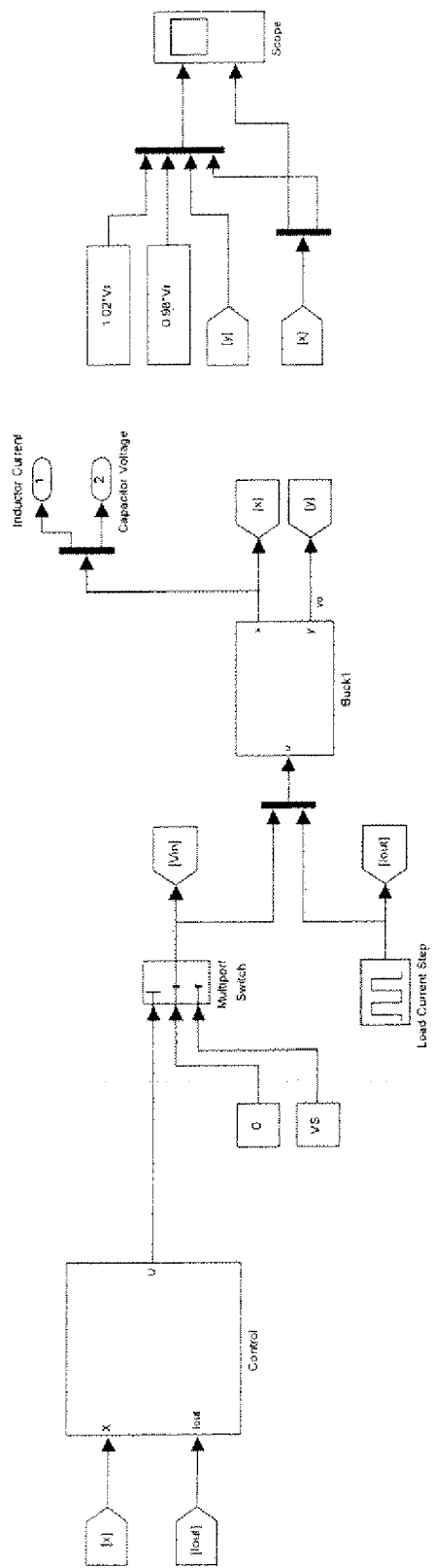
FIGS. 15, 16, 17, 18 show the Mathworks Simulink model used for the simulation of one embodiment of the system of these teachings.
Figure 16:
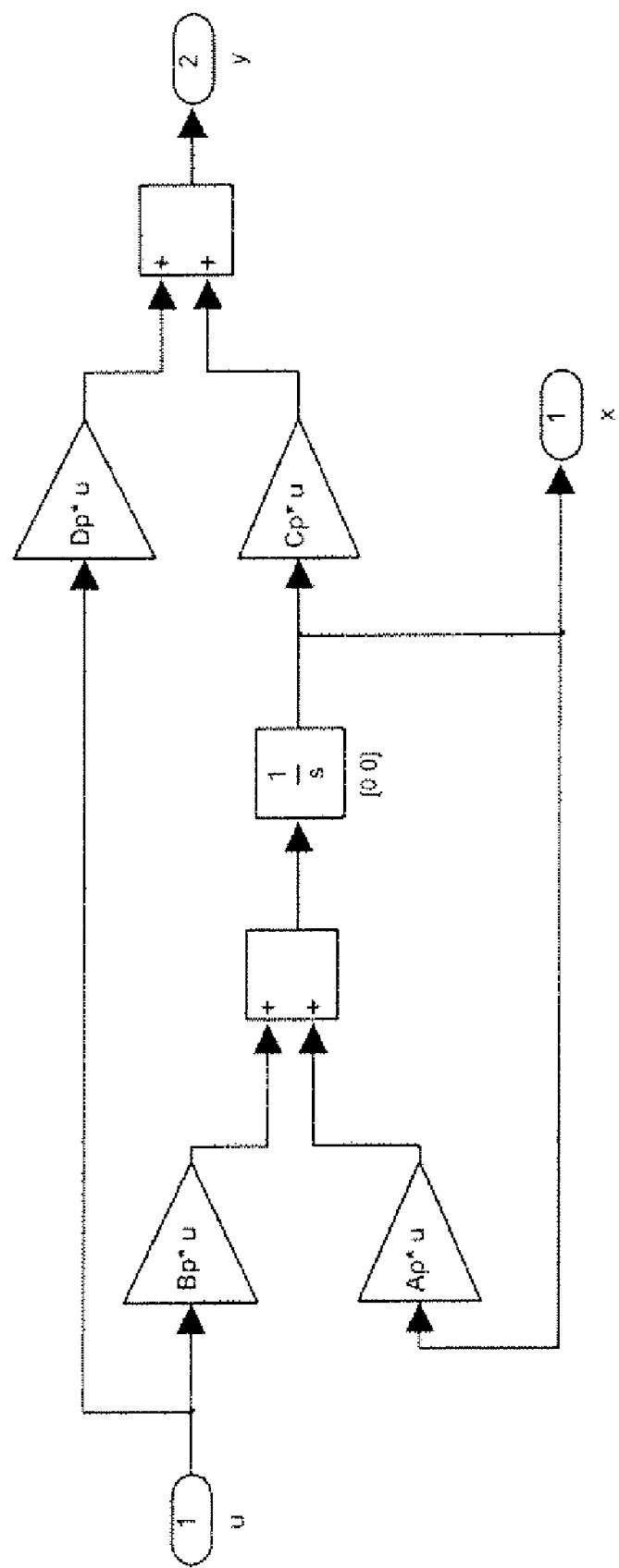
Figure 17:
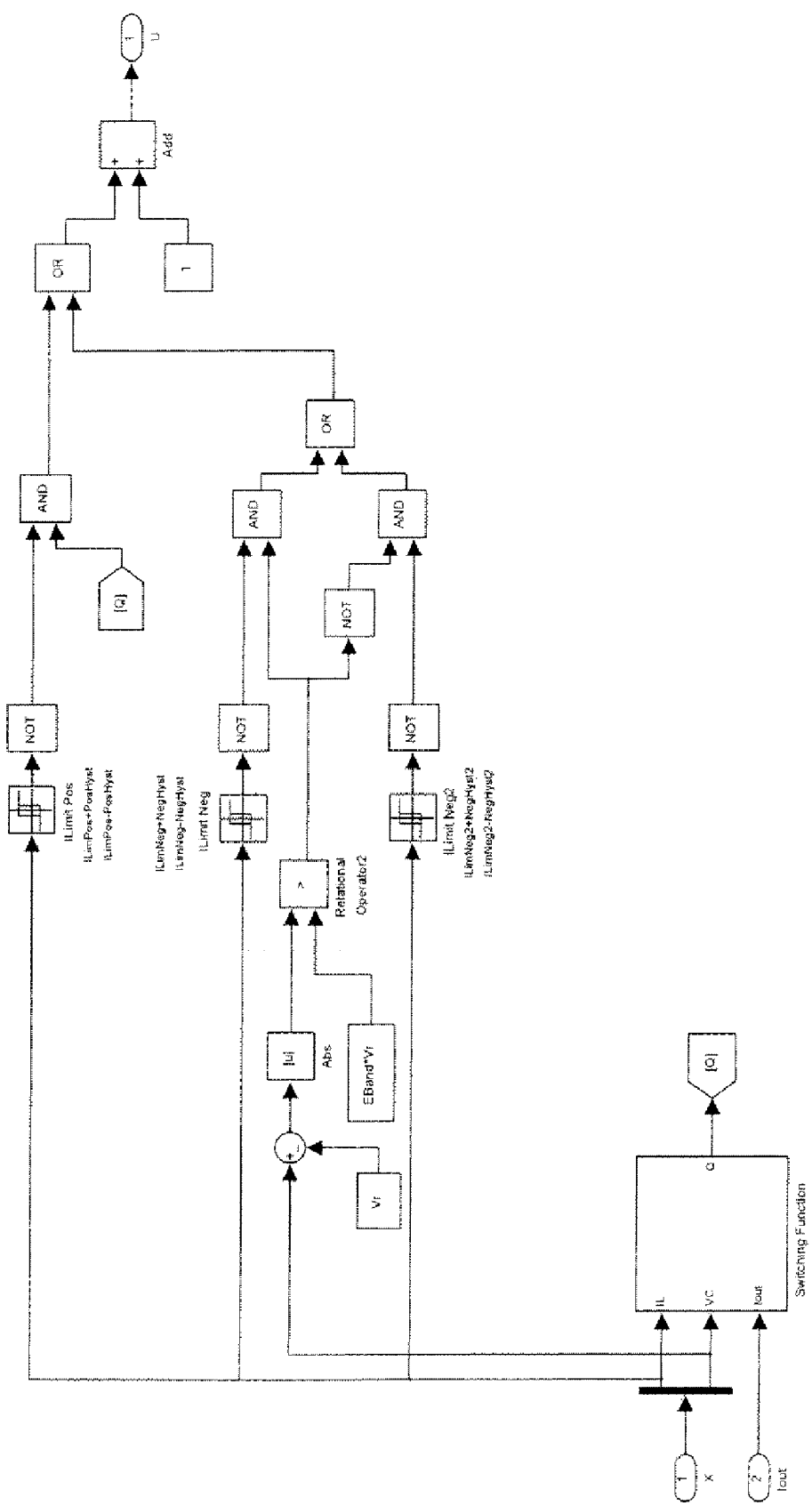
Figure 18:
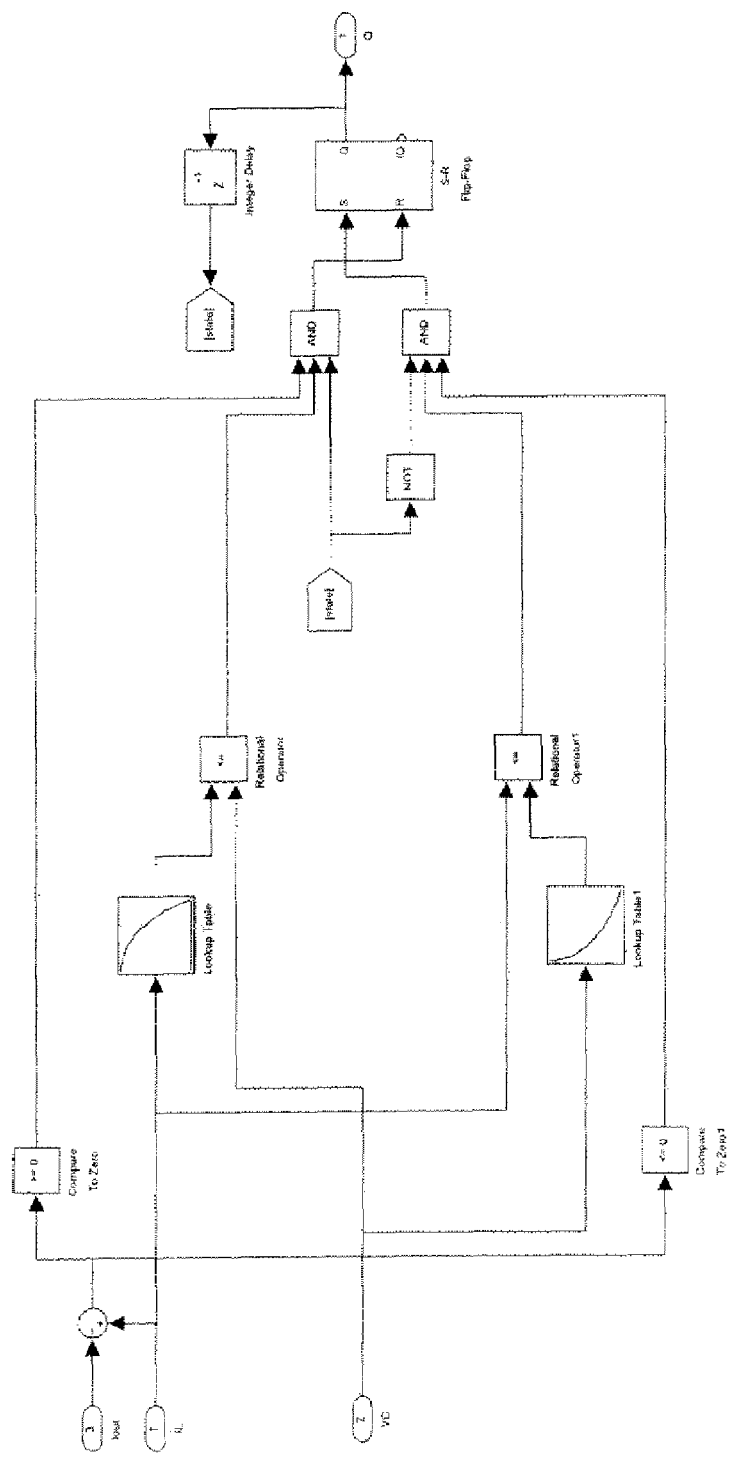

Simulation results for the exemplary embodiment are provided hereinbelow. FIG. 14 shows a startup trajectory in the phase plane. Hysteretic current limit and stable orbits can be seen along with limited minimum inductor current. FIGS. 15, 16 show the Mathworks Simulink model used for the simulation. FIG. 15 is the top level. FIG. 16 is the model of the buck converter in state-space form. FIG. 17 is the model of the non-linear controller logic. FIG. 18 is switching function model for the non-linear controller logic.

Although the present teachings have been described with respect to various embodiments, it should be realized these teachings are also capable of a wide variety of further and other embodiments within the spirit of the present teachings.

What is claimed is:

1. A controller for switching power supplies, the controller comprising:
   a nonlinear controller component providing a switch state to a switch driver, said switch state corresponding to predetermined switching power supply state variables; said switch state being obtained from a nonlinear relationship between switch states and power supply state variables;
   said nonlinear controller component being operatively connected to receive as inputs at least one predetermined switching power supply state variable;
   said nonlinear relationship between switch states and at least one predetermined switching power supply state variable being obtained by optimizing, utilizing optimization techniques, a predetermined function of said switch states and internal states.

2. The controller of claim 1 wherein said nonlinear controller component comprises;
   a plurality of comparators, said plurality of comparators operatively connected to provide a substantially piecewise linear approximation to said relationship between switch states and at least one predetermined switching power supply state variable.

3. The controller of claim 1 wherein said nonlinear relationship is obtained by minimizing said predetermined function utilizing dynamic programming.

4. The controller of claim 1 wherein said predetermined function is subject to at least one constraint.

5. The controller of claim 1 wherein said relationship is obtained by minimizing said predetermined function utilizing optimization techniques.

6. The controller of claim 1 further comprising:
   a state estimation component receiving an output voltage and an input to a switching power supply and of providing an estimate of states in a state model of the switching power supply and an estimate of a load current of said switching power supply.

7. The controller of claim 6 further comprising:
   a load current predictor receiving an estimate of present load current from said state estimator component; said load current predictor predicting a future load current value.

8. The controller of claim 7 wherein said load current predictor comprises a digital filter.

9. The controller of claim 8 wherein said digital filter is a finite impulse response filter.

10. The controller of claim 8 wherein said digital filter is an infinite impulse response filter.

11. The controller of claim 8 wherein filter coefficients of said filter are determined by an LMS type algorithm.

12. The controller of claim 8 wherein filter coefficients of said filter are determined by an RLS type algorithm.

13. The controller of claim 7 wherein said load current predictor receives an input signal indicating future occurrence of a sudden change in load; said load current predictor predicting the future load current value after occurrence of the sudden change in load.

14. The controller of claim 13 wherein said load current predictor utilizes a nonlinear lookup table.

15. The controller of claim 14 wherein said nonlinear lookup table is implemented by means of a neural network.

16. The controller of claim 1 wherein said nonlinear controller component comprises a memory for access by an application component, said memory comprising:
   a data structure stored said memory, said data structure comprising:
   a plurality of switch states, each switch state in said plurality of switch states having corresponding predetermined switching power supply state variables;
   said each switch state, when provided to the switch driver enables obtaining a predetermined switching power supply output.

17. The controller of claim 1 wherein said nonlinear controller component comprises:
   at least one processor; and
   at least one computer usable medium having computer readable code embodied therein, said computer readable code causing said at least one processor to:
   apply an optimization technique to minimize the predetermined function; and
   obtain, from applying the optimization technique, the nonlinear relationship between switch states and predetermined switching power supply state variables.

18. The controller of claim 17 wherein said optimization technique is dynamic programming.

19. The controller of claim 17 wherein said optimization technique is selected from the group consisting of model predictive control, genetic programming, simulated annealing, exhaustive numerical search, and neural networks.

20. A system comprising:
   a switching power supply comprising:
      a circuit comprising at least two reactive components configured to provide an output voltage and capable of being switched from one output voltage state to another output voltage state,
      at least one switching component, said at least one switching component operatively connected to switch said circuit between at least two switching states, said at least two switching states comprising said one output voltage state and said another output voltage state,
      a driver component operatively connected to receive an input control signal and also operatively connected to drive the at least one switching component in order to cause switching between two of said at least two switching states; and
   a nonlinear controller component operatively connected to provide a switching state to said driver component, said switching state corresponding to predetermined switching power supply state variables;
   said nonlinear controller component being operatively connected to receive as inputs predetermined switching power supply state variables; said
   switch state being obtained from a nonlinear relationship between switch states and power supply state variables;
   said nonlinear relationship between switch states and predetermined switching power supply state variables being obtained by optimizing, utilizing optimization techniques, a predetermined function of said switch states and internal states.

21. The system of claim 20 wherein said nonlinear controller component comprises a memory for access by an application component, said memory comprising:
 a data structure stored said memory, said data structure comprising:
  a plurality of switching states, each switching state in said plurality of switching states having a corresponding at least one predetermined switching power supply state variable;
  said switching state, when provided to the switch driver of the switching power supply, enables obtaining a predetermined switching power supply output.

22. The system of claim 20 wherein said nonlinear controller component comprises:
 a plurality of comparators, said plurality of comparators operatively connected to provide a substantially piecewise linear approximation to said nonlinear relationship between switching states and at least one predetermined switching power supply state variable.

23. The system of claim 20 wherein said nonlinear relationship is obtained by minimizing said predetermined function utilizing dynamic programming.

24. The system of claim 20 wherein said predetermined function is subject to at least one constraint.

25. The system of claim 20 wherein said nonlinear relationship is obtained by minimizing said predetermined function utilizing optimization techniques.

26. The system of claim 20 further comprising:
 a state estimation component receiving an output voltage and an input to a switching power supply and of providing an estimate of states in a state model of the switching power supply and an estimate of a load current of said switching power supply.

27. The system of claim 26 further comprising:
 a load current predictor receiving an estimate of present load current from said state estimator component; said load current predictor of predicting a future load current value.

28. The system of claim 27 wherein said load current predictor comprises a digital filter.

29. The system of claim 28 wherein said digital filter is a finite impulse response filter.

30. The system of claim 28 wherein said digital filter is an infinite impulse response filter.

31. The system of claim 28 wherein filter coefficients of said filter are determined by an LMS type algorithm.

32. The system of claim 28 wherein filter coefficients of said filter are determined by an RLS type algorithm.

33. The system of claim 27 wherein said load current predictor receives an input signal indicating future occurrence of a sudden change in load; said load current predictor predicting the future load current value after occurrence of the sudden change in load.

34. The system of claim 33 wherein said load current predictor utilizes a nonlinear lookup table.

35. The system of claim 20 wherein said nonlinear controller component comprises;
 at least one processor; and
 at least one computer usable medium having computer readable code embodied therein, said computer readable code causing said at least one processor to:
  apply an optimization technique to minimize a predetermined function; and
  obtain, from applying the optimization technique, the nonlinear relationship between switch states and predetermined switching power supply state variables.

36. The system of claim 35 wherein said optimization technique is selected from the group consisting of model predictive control, genetic programming, and neural networks.

37. The system of claim 35 wherein said optimization technique is dynamic programming.

38. A method for controlling a switching power supply, the method comprising the steps of:
 minimizing, utilizing optimization techniques, a function of switching states and internal states of the switching power supply;
 obtaining, from said minimizing, a nonlinear relationship between switching states and predetermined switching power supply state variables; providing a switching state to a switch driver in the switching power supply.

39. The method of claim 38 wherein the step of minimizing the function comprises the step of utilizing dynamic programming to minimize the function.

40. The method of claim 38 further comprising the step of:
 estimating at least some of the internal states and a load current of the switching power supply; and
 utilizing results of estimating in minimizing the function.

41. The method of claim 40 further comprising the step of predicting a future load current from the present load current.

42. The method of claim 41 wherein the step of predicting the future load current comprises the step of receiving a signal indicating future occurrence of a sudden change in load current.

43. The method of claim 40 further comprising the step of estimating parameters for a model of the switching power supply.

* * * * *

UNITED STATES PATENT AND TRADEMARK OFFICE
CERTIFICATE OF CORRECTION

| | | |
|---|---|---|
| PATENT NO. | : 7,545,130 B2 | Page 1 of 1 |
| APPLICATION NO. | : 11/558638 | |
| DATED | : June 9, 2009 | |
| INVENTOR(S) | : Paul Latham | |

It is certified that error appears in the above-identified patent and that said Letters Patent is hereby corrected as shown below:

On the title page, under References Cited (56), and further under OTHER PUBLICATIONS, please add:

--Mayne, D.Q. et al. Adaptive receding horizon control for constrained nonlinear systems, Proceedings of the 32nd IEEE Conference on Decision and Control, Date: 15-17 Dec 1993, Pages: 1286 – 1291, Vol.2.

Haykin, S. Introduction to Adaptive Filters, ISBN 0-02-949460-5, pp. 41-89, pp.108-110, and pp.139-143.

International Search Report for PCT/US06/60778 dated 4/11/08. Applicant: L&L Engineering LLC.--

In Column 11, lines 30-31 (claim 26), "supply and of providing" should read --supply and providing--

Signed and Sealed this

Fourteenth Day of July, 2009

JOHN DOLL
*Acting Director of the United States Patent and Trademark Office*